United States Patent
Ando et al.

(10) Patent No.: US 12,179,391 B2
(45) Date of Patent: Dec. 31, 2024

(54) RELEASE AGENT FOR PLASTIC

(71) Applicant: SHIN-ETSU CHEMICAL CO., LTD., Tokyo (JP)

(72) Inventors: Yuko Ando, Tomioka (JP); Saori Ubukata, Takasaki (JP); Hanako Tawata, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 622 days.

(21) Appl. No.: 17/612,597

(22) PCT Filed: Apr. 29, 2020

(86) PCT No.: PCT/JP2020/018204
§ 371 (c)(1),
(2) Date: Nov. 19, 2021

(87) PCT Pub. No.: WO2020/241164
PCT Pub. Date: Dec. 3, 2020

(65) Prior Publication Data
US 2022/0234257 A1 Jul. 28, 2022

(30) Foreign Application Priority Data
May 24, 2019 (JP) ................. 2019-097409

(51) Int. Cl.
| | | |
|---|---|---|
| *B29C 33/64* | (2006.01) | |
| *C08J 7/04* | (2020.01) | |
| *C08K 5/1545* | (2006.01) | |
| *C08L 71/02* | (2006.01) | |
| *C08L 71/08* | (2006.01) | |
| *C08L 83/04* | (2006.01) | |
| *C08G 77/04* | (2006.01) | |
| *C08G 77/12* | (2006.01) | |
| *C08G 77/16* | (2006.01) | |

(52) U.S. Cl.
CPC ............ *B29C 33/64* (2013.01); *C08J 7/0427* (2020.01); *C08K 5/1545* (2013.01); *C08L 71/02* (2013.01); *C08L 71/08* (2013.01); *C08L 83/04* (2013.01); *C08G 77/04* (2013.01); *C08G 77/12* (2013.01); *C08G 77/16* (2013.01); *C08J 2367/02* (2013.01); *C08J 2483/04* (2013.01)

(58) Field of Classification Search
CPC ..... B29C 33/64; C08J 7/0427; C08J 2367/02; C08J 2483/04; C08K 5/1545; C08L 71/02; C08L 71/08; C08L 83/04; C08G 77/04; C08G 77/12; C08G 77/16
See application file for complete search history.

(56) References Cited

U.S. PATENT DOCUMENTS

| | | | |
|---|---|---|---|
| 4,678,513 | A | 7/1987 | Bagaglio et al. |
| 2004/0235683 | A1 | 11/2004 | Moffett |
| 2010/0078104 | A1 | 4/2010 | Breunig et al. |
| 2018/0036917 | A1 | 2/2018 | Inokuchi et al. |
| 2018/0346661 | A1 | 12/2018 | Ando |

FOREIGN PATENT DOCUMENTS

| | | | | |
|---|---|---|---|---|
| CN | 1795082 | A | 6/2006 | |
| CN | 108997929 | A | 12/2018 | |
| EP | 0254274 | B1 | 11/1994 | |
| JP | S60-217259 | A | 10/1985 | |
| JP | S63-153108 | A | 6/1988 | |
| JP | H07-070547 | A | 3/1995 | |
| JP | H07-91529 | B2 | 10/1995 | |
| JP | H07-316432 | A | 12/1995 | |
| JP | H08188744 | A | * 7/1996 | ............... A61K 8/06 |
| JP | H08-283771 | A | 10/1996 | |
| JP | H11-140191 | A | 5/1999 | |
| JP | 2000-169705 | A | 6/2000 | |
| JP | 3106079 | B2 | 11/2000 | |
| JP | 2002-086639 | A | 3/2002 | |
| JP | 2004-018797 | A | 1/2004 | |
| JP | 2004-035820 | A | 2/2004 | |
| JP | 2004-331784 | A | 11/2004 | |
| JP | 3638087 | B2 | 4/2005 | |
| JP | 2005-281409 | A | 10/2005 | |
| JP | 3835646 | B2 | 10/2006 | |
| JP | 2010-505970 | A | 2/2010 | |
| JP | 2011-032586 | A | 2/2011 | |
| JP | 4722542 | B2 | 7/2011 | |
| JP | 4828054 | B2 | 11/2011 | |
| WO | 2016/132834 | A1 | 8/2016 | |
| WO | WO-2019044391 | A1 | * 3/2019 | ............... A61K 8/06 |

OTHER PUBLICATIONS

JP-H08188744-A, machine translation (Year: 1996).*
WO-2019044391-A1, machine translation (Year: 2019).*
May 30, 2023 Extended European Search Report Issued in European Patent Application No. 20814858.5.
Aug. 11, 2020 International Search Report issued in International Patent Application No. PCT/JP2020/018204.
Mar. 15, 2024 Search Report issued in Chinese Patent Application No. 2020800370286.

* cited by examiner

*Primary Examiner* — Anthony J Green
*Assistant Examiner* — Marites A Guino-O Uzzle
(74) *Attorney, Agent, or Firm* — Oliff PLC

(57) ABSTRACT

A release agent for plastic contains the following components (A) to (E) and has an average particle size of 200 nm or less: (A) 100 parts by mass of an organopolysiloxane having a viscosity at 25° C. of 100 to 100,000 mm$^2$/s; (B) 0.1 to 15.0 parts by mass of one or more anionic surfactants; (C) 1.0 to 30.0 parts by mass of a polyoxyethylene alkyl ether; (D) 0.5 to 15.0 parts by mass of a polyoxyethylene sorbitan fatty acid ester; and (E) 50 to 100,000 parts by mass of water. The release agent is an organopolysiloxane emulsion having excellent dilution stability and mechanical stability and favorable wettability, and hardly cracking plastic.

20 Claims, No Drawings

RELEASE AGENT FOR PLASTIC

TECHNICAL FIELD

The present invention relates to a release agent for plastic which is an emulsion composition of an organopolysiloxane.

BACKGROUND ART

In view of freshness and hygiene, food is sold with protection using a plastic tray, sheet, film, etc. Various plastics such as PET, PP, and PS for food container or wrap are used depending on the type of the food or storage temperature.

Plastic for food container or wrap is, in a manufacturing process thereof, formed into a sheet or film, and then rolled up into a roll form. Usually, a surface of the sheet or film is coated with a release agent during the rolling up into a roll so as to prevent the sheet or film from adhering to itself.

In addition, moldings such as cases, trays, or cups made by molding a sheet or film are stored in piles, and when a release agent is applied thereto, the mold products can be detached smoothly one by one without blocking.

In view of releasability and smoothness, an emulsion composition of an organopolysiloxane having a viscosity of 100 to 100,000 mm$^2$/s is suitable as a release agent for a synthetic resin for food container or wrap. When an emulsion composition of an organopolysiloxane is applied to plastic as a release agent, the composition is diluted with water so that the concentration of the organopolysiloxane becomes 0.1 to 5.0%, and is applied by rotor damping, a gravure system, or a spray system.

In an application method like rotor damping, which is accompanied by vigorous stirring, there is risk of gel, oil floating, or the like due to destruction of the emulsion itself. If a plastic is coated with such emulsion with gel or oil floating occurring, uneven wetting occurs, and problems arise such as adhesion of plastics with each other and uneven appearance.

Furthermore, if an organopolysiloxane emulsion containing a large amount of nonionic surfactant is applied to plastic, there sometimes arises a problem that a crack occurs as the plastic is impregnated with the nonionic surfactant, so that a crack appears in the molding. Such cracks are particularly liable to occur in OPS and PS among plastics.

Accordingly, there is demand for an emulsion type release agent of an organopolysiloxane, which has excellent dilution stability, mechanical stability, and storage stability, and favorable wettability, and which does not cause plastic to crack.

In Japan, Japan Hygienic Olefin and Styrene Plastics Association determines (positive list system) raw materials that can be used for plastic containers, wraps, etc., where the plastic contacts food directly. It is recommended that raw materials confirmed to be safe be used in usage for containers and packages that contact food directly.

Accordingly, as a release agent for plastic for food container or wrap, an organopolysiloxane emulsion is desired which uses raw materials registered in the positive list of the Japan Hygienic Olefin and Styrene Plastics Association, and which can deal with the above problem and object.

Various means have been considered before now to solve the above problems.

Patent Document 1 considers an organopolysiloxane emulsion release agent composition having excellent wettability and favorable transparency. In Examples, the average particle size is 200 nm or more in all cases, which is so large that there is a possibility that dilution stability and mechanical stability are poor. In addition, in the Examples, sodium polyoxyethylene nonyl phenyl ether sulfate is used as an anionic surfactant, but is regarded with concern as a substance having environmental impact. Therefore, this composition is not recommended for use as a release agent for plastic to be used for food container or wrap.

Patent Document 2 considers a silicone release agent composition with causes little whitening of a film. The composition of Patent Document 2 includes propylene glycol. In addition, in Examples, a polyoxyethylene lauryl ether is used alone as a nonionic emulsifier. If a nonionic emulsifier is used alone, average particle size does not become small, and there is also risk of poor stability. Moreover, among polyoxyethylene lauryl ethers, those having 1 to 6 polyoxyethylene chains have a risk of causing cracks to synthetic resin, in particular, PS and OPS. Therefore, even the emulsions in the Examples of Patent Document 2 have a risk of causing cracks when used as release agents of PS or OPS.

Patent Document 3 considers an emulsion in which phenoxy ethanol is blended when emulsifying, the emulsion having a narrow particle size distribution and good stability. However, the average particle sizes in the Examples are all 1 μm or more, which is so large that it can be expected that dilution stability and mechanical stability are low.

Patent Document 4 considers an emulsion release agent of a silicone co-modified with alkyl and aralkyl for aluminum die casting. Alkyl-aralkyl co-modified silicone exhibits lower releasability relative to plastic than dimethylpolysiloxane, and is not suitable for a release agent for plastic.

Patent Document 5 considers a silicone water-dispersion release agent composition that uses a combination of a sorbitan higher alkyl ester and another nonionic surfactant, and that is used suitably in vulcanizing and molding acrylic rubber. In a silicone emulsion, it is said that if an anionic surfactant is blended, a negative value of the zeta potential of the emulsion becomes large, and the electron repulsion between emulsion particles becomes strong, so that the particles do not easily cohere, and mechanical stability can be enhanced. No anionic surfactant is blended in Patent Document 5, and mechanical stability is expected to be low.

Patent Document 6 considers an emulsion obtained by emulsifying an organopolysiloxane with a polyoxyethylene alkyl ether having an HLB of 10 or higher. No anionic surfactant is blended as in Patent Document 5, and mechanical stability is expected to be low.

Patent Document 7 considers a silicone emulsion composition containing an organopolysiloxane, a polyoxyethylene alkyl ether with an alkyl chain having 8 to 11 carbon atoms, and an anionic surfactant. An emulsion containing a polyoxyethylene alkyl ether having 8 to 11 carbon atoms has a risk of causing crack when applied to plastic.

Patent Document 8 considers a silicone emulsion composition obtained by emulsifying an organopolysiloxane with a polyoxyethylene alkyl ether and a sucrose fatty acid ester. In Examples, polyoxyethylene (3) decyl ether is used as the polyoxyethylene alkyl ether. However, a polyoxyethylene alkyl ether with an alkyl group having 10 or fewer carbon atoms has a risk of cracking plastic.

Patent Document 9 considers a silicone emulsion obtained by emulsifying an organopolysiloxane with a polyoxyethylene hexyldecyl ether or a polyoxyethylene isostearyl ether. In Examples, average particle size is about 400 nm, which is comparatively large, and there is risk of poor dilution stability and mechanical stability.

Patent Document 10 considers an emulsion obtained by emulsifying an organopolysiloxane with an anionic surfactant and a polyhydric alcohol. Generally, anionic surfactants and polyhydric alcohols have a lower function of reducing surface tension than nonionic surfactants such as a polyoxyethylene alkyl ether. The emulsion of Patent Document 10 has a high surface tension at 25° C. of 45 dyne/cm or higher, even when diluted 50 times with water. In addition, no nonionic surfactant is contained. Therefore, there is risk that wettability becomes poor and repellence occurs when the emulsion is applied to plastic.

CITATION LIST

Patent Literature

Patent Document 1: JP 3106079 B
Patent Document 2: JP 2005-281409 A
Patent Document 3: JP 2000-169705 A
Patent Document 4: JP 4722542 B
Patent Document 5: JP H8-283771 A
Patent Document 6: JP 3638087 B
Patent Document 7: JP 2004-331784 A
Patent Document 8: JP 2004-035820 A
Patent Document 9: JP 4828054 B
Patent Document 10: JP 3835646 B

SUMMARY OF INVENTION

Technical Problem

The present invention has been made in view of the above-described circumstances, and an object thereof is to provide a release agent for plastic, the release agent being an organopolysiloxane emulsion having excellent dilution stability and mechanical stability, and favorable wettability, and hardly cracking plastic.

Solution to Problem

To achieve the above-described object, the present invention provides a release agent for plastic, comprising the following components (A) to (E) and having an average particle size of 200 nm or less:
(A) 100 parts by mass of an organopolysiloxane represented by the following general formula (1) and having a viscosity at 25° C. of 100 to 100,000 mm²/s,

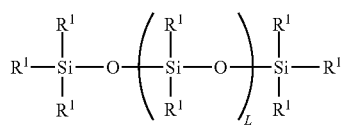

(1)

wherein $R^1$ is identical to or different from one another and represents a hydroxy group, a hydrogen atom, a linear, unsubstituted alkyl group having 1 to 32 carbon atoms, or a phenyl group,
L represents an integer of 60 to 1500, and
octamethyl cyclotetrasiloxane, decamethyl cyclopentasiloxane, and dodecamethyl cyclohexasiloxane are each contained in an amount of less than 3% in the organopolysiloxane (A);
(B) 0.1 to 15.0 parts by mass of one or more anionic surfactants selected from alkyl sulfonate salts, alkyl-benzene sulfonate salts, alpha olefin sulfonate salts, polyoxyethylene alkyl ether sulfate salts, alkyl ether sulfate salts, polyoxyethylene alkyl ether acetate salts, alkyl acetate salts, alkyl phosphate salts, polyoxyethylene alkyl ether phosphate salts, alkyl sulfosuccinate salts, polyoxyethylene alkyl ether sulfosuccinate salts, methyl taurate, alaninate, and salts thereof;
(C) 1.0 to 30.0 parts by mass of a polyoxyethylene alkyl ether represented by the following general formula (2),

(2)

wherein "m" represents an integer of 12 to 20, and "n" represents an integer of 4 to 50, provided that when "m" is an integer of 12 to 15, "n" is 8 to 50, and when "m" is 16 to 20, "n" is 4 to 50;
(D) 0.5 to 15.0 parts by mass of a polyoxyethylene sorbitan fatty acid ester represented by the following general formula (3),

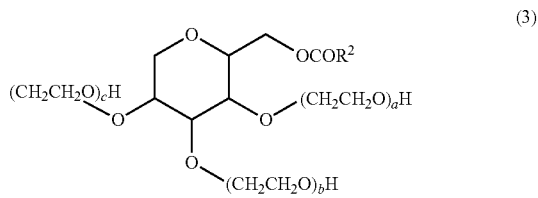

(3)

wherein $R^2$ represents an alkyl group having 12 to 18 carbon atoms, and a sum of a+b+c is 20; and
(E) 50 to 100,000 parts by mass of water.

With the inventive release agent for plastic, it is possible to provide a release agent for plastic, the release agent being an organopolysiloxane emulsion having excellent dilution stability and mechanical stability, and favorable wettability, and not easily cracking plastic.

The inventive release agent for plastic preferably further comprises (F) 5.0 parts by mass or less of a sorbitan fatty acid ester represented by the following general formula (4) relative to 100 parts by mass of the organopolysiloxane (A),

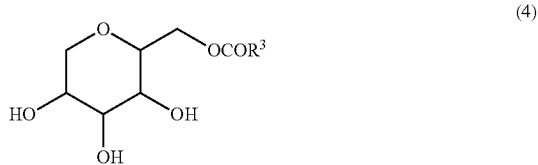

(4)

wherein $R^3$ represents an alkyl group having 12 to 22 carbon atoms.

By blending a sorbitan fatty acid ester as described above, it is possible to make the composition further less liable to induce stress cracking in plastic. In addition, it is possible to achieve the effects of enhancing stability of the release agent for plastic, lowering foamability, and facilitating handling.

The sorbitan fatty acid ester (F) is preferably contained in an amount of 0.1 to 5.0 parts by mass.

When the sorbitan fatty acid ester (F) is contained in an amount within this range, cracks occur less when the inventive release agent for plastic is applied.

Furthermore, the anionic surfactant (B) is preferably contained in an amount of 0.1 to 10.0 parts by mass.

When the anionic surfactant (B) is contained in an amount within this range, the inventive release agent for plastic tends to have higher mechanical stability and releasability.

Furthermore, the release agent for plastic preferably has an average particle size of 100 nm or less.

Such a release agent for plastic tends to have both favorable dilution stability and favorable mechanical stability, and oil floating or the like occurs less during dilution or stirring.

Furthermore, the release agent for plastic preferably has a pH at 25° C. of 4.0 to 10.0.

This is because even when such a release agent for plastic is stored at a high temperature, the structure of the component (A) would not change, and the influence on releasability of plastic is small.

The release agent for plastic can be used particularly suitably for plastic for food container or wrap.

This is because the inventive release agent for plastic does not contain substances having environmental impact such as nonylphenol and octylphenol. In addition, the composition of the inventive release agent for plastic can be constituted with only raw materials approved by "the voluntary standards concerning food containers, wrappers, etc., made of synthetic resin such as polyolefin". Such a release agent for plastic is suitable as a release agent for food trays and egg cartons.

Advantageous Effects of Invention

As described above, according to the present invention, since the particle size of the emulsion is small, it is possible to provide a release agent for plastic having good dilution stability, mechanical stability, and storage stability, and excellent wettability to plastic, and hardly stress-cracking plastic. Moreover, the inventive release agent for plastic can be constituted with raw materials described in the positive list provided by the Japan Hygienic Olefin and Styrene Plastics Association, and is suitable for food container or wrap.

DESCRIPTION OF EMBODIMENTS

As described above, there is demand for an emulsion type release agent of an organopolysiloxane, which has excellent dilution stability, mechanical stability, and storage stability, and favorable wettability, and which does not cause crack in plastic.

The present inventors have earnestly studied to achieve the above-described object, and found out the following. It is possible to prepare an emulsion type release agent for plastic having an average particle size of 200 nm or less by emulsifying an organopolysiloxane having a viscosity at 25° C. of 100 to 100,000 mm²/s with an anionic surfactant, a polyoxyethylene alkyl ether, a polyoxyethylene sorbitan fatty acid ester, and if needed, a sorbitan fatty acid ester. The obtained release agent has strong points that the release agent is excellent in dilution stability, mechanical stability, and storage stability, has favorable wettability to plastic, and is not liable to cause stress cracking. Thus, the present invention has been completed. In addition, the inventive release agent for plastic can be constituted with raw materials registered in the positive list of Japan Hygienic Olefin and Styrene Plastics Association, and can be used safely even for packaging containers etc. that contact food directly.

Hereinafter, the present invention will be described in detail, but the present invention is not limited thereto.

[Release Agent for Plastic]

The inventive release agent for plastic contains the following components (A) to (E) and has an average particle size of 200 nm or less:

(A) 100 parts by mass of an organopolysiloxane represented by the following general formula (1) and having a viscosity at 25° C. of 100 to 100,000 mm²/s,

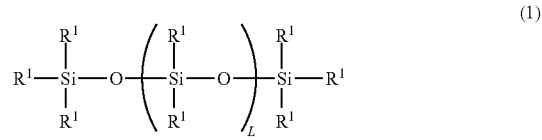

where $R^1$ is identical to or different from one another and represents a hydroxy group, a hydrogen atom, a linear, unsubstituted alkyl group having 1 to 32 carbon atoms, or a phenyl group, L represents an integer of 60 to 1500, and octamethyl cyclotetrasiloxane, decamethyl cyclopentasiloxane, and dodecamethyl cyclohexasiloxane are each contained in an amount of less than 3% in the organopolysiloxane (A);

(B) 0.1 to 15.0 parts by mass of one or more anionic surfactants selected from alkyl sulfonate salts, alkylbenzene sulfonate salts, alpha olefin sulfonate salts, polyoxyethylene alkyl ether sulfate salts, alkyl ether sulfate salts, polyoxyethylene alkyl ether acetate salts, alkyl acetate salts, alkyl phosphate salts, polyoxyethylene alkyl ether phosphate salts, alkyl sulfosuccinate salts, polyoxyethylene alkyl ether sulfosuccinate salts, methyl taurate, alaninate, and salts thereof;

(C) 1.0 to 30.0 parts by mass of a polyoxyethylene alkyl ether represented by the following general formula (2), $$C_mH_{2m+1}(OCH_2CH_2)_nOH \quad (2)$$

where "m" represents an integer of 12 to 20, and "n" represents an integer of 4 to 50, provided that when "m" is an integer of 12 to 15, "n" is 8 to 50, and when "m" is 16 to 20, "n" is 4 to 50;

(D) 0.5 to 15.0 parts by mass of a polyoxyethylene sorbitan fatty acid ester represented by the following general formula (3),

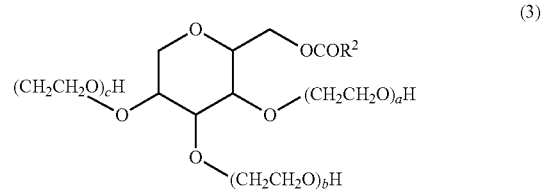

where $R^2$ represents an alkyl group having 12 to 18 carbon atoms, and a sum of a+b+c is 20; and (E) 50 to 100,000 parts by mass of water.

[(A) Organopolysiloxane]

(A) 100 parts by mass of an organopolysiloxane represented by the following general formula (1) and having a viscosity at 25° C. of 100 to 100,000 mm²/s.

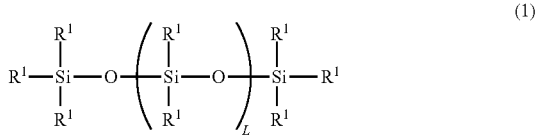
(1)

In the formula, $R^1$ is identical to or different from one another and represents a hydroxy group, a hydrogen atom, a linear, unsubstituted alkyl group having 1 to 32 carbon atoms, or a phenyl group. L represents an integer of 60 to 1500. Octamethyl cyclotetrasiloxane, decamethyl cyclopentasiloxane, and dodecamethyl cyclohexasiloxane are each contained in an amount of less than 3% in the organopolysiloxane (A).

In the formula (1), $R^1$ may be identical to or different from one another, and represents a linear, unsubstituted alkyl group having 1 to 32 carbon atoms, a phenyl group, a hydroxy group, or a hydrogen atom. L represents an integer of 60 to 1500, preferably 150 to 1200. Examples of the linear, unsubstituted alkyl group having 1 to 32 carbon atoms include alkyl groups such as a methyl group, an ethyl group, a propyl group, a butyl group, a pentyl group, a hexyl group, an octyl group, an n-decyl group, an n-dodecyl group, an n-tetradecyl group, an n-hexadecyl group, an n-octadecyl group, and an eicosyl group. A linear, unsubstituted alkyl group having 1 to 20 carbon atoms or a phenyl group is preferable, and in view of wide usage, a methyl group or a phenyl group is more preferable. Furthermore, in view of releasability, at least 50 mol % of organic groups bonded to silicon atoms in one molecule is preferably a methyl group.

If a large amount of octamethyl cyclotetrasiloxane, decamethyl cyclopentasiloxane, and dodecamethyl cyclohexasiloxane is contained in the organopolysiloxane (A), there are risks that emulsification becomes difficult, average particle size increases, or storage stability, dilution stability, and mechanical stability become degraded. The contained amounts of octamethyl cyclotetrasiloxane, decamethyl cyclopentasiloxane, and dodecamethyl cyclohexasiloxane in the organopolysiloxane (A) are each less than 3%. The amounts are preferably less than 1% each, more preferably less than 0.1% each. Note that although there is no restriction to the lower limits of the contained amounts, the lower limit can be, for example, 0.001%.

The organopolysiloxane of the component (A) has a viscosity at 25° C. of 100 to 100,000 mm²/s. If the viscosity is lower than 100 mm²/s, the obtained composition does not exhibit sufficient releasability. In addition, the lowest viscosity of the dimethylpolysiloxane, methylhydrogenpolysiloxane, and methylphenylpolysiloxane registered in the positive list of the Japan Hygienic Olefin and Styrene Plastics Association is 100 mm²/s. On the other hand, if the viscosity of the organopolysiloxane of the component (A) is higher than 100,000 mm²/s, there is risk that the surface of a film or the like coated with the resulting composition becomes sticky. The viscosity is preferably 200 to 50,000 mm²/s, more preferably 300 to 10,000 mm²/s.

The organopolysiloxane of the component (A) can have a viscosity at 25° C. within the above-described range, and one kind of the organopolysiloxane may be used, or two or more kinds thereof may be mixed.

[(B) Anionic Surfactant]

(B) 0.1 to 15.0 parts by mass of one or more anionic surfactants selected from alkyl sulfonate salts, alkylbenzene sulfonate salts, alpha olefin sulfonate salts, polyoxyethylene alkyl ether sulfate salts, alkyl ether sulfate salts, polyoxyethylene alkyl ether acetate salts, alkyl acetate salts, alkyl phosphate salts, polyoxyethylene alkyl ether phosphate salts, alkyl sulfosuccinate salts, polyoxyethylene alkyl ether sulfosuccinate salts, methyl taurate, alaninate, and salts thereof.

Among these anionic surfactants, those having the following structures are listed in the positive list of the Japan Hygienic Olefin and Styrene Plastics Association. When the inventive release agent for plastic is to be used for plastic for food container or wrap, it is more preferable to select those having the following structures. In the alkyl sulfonate salts, the alkyl group has 10 to 20 carbon atoms, and the salts are formed with sodium, potassium, or ammonium. The number of carbon atoms is preferably 10 to 15. When the number of carbon atoms is 10 to 15, the particle size of the emulsion that is the inventive release agent for plastic becomes smaller easily, and storage stability is favorable. In the alkylbenzene sulfonate salts, the alkyl group has 9 to 20 carbon atoms, and the salts are formed with sodium, potassium, or ammonium. The number of carbon atoms is preferably 9 to 15. When the number of carbon atoms is 9 to 15, the particle size of the inventive release agent for plastic becomes smaller easily, and storage stability is favorable. In the alkyl ether sulfate salts, the alkyl group has 12 to 16 carbon atoms, and the salts are sodium salts. In the alkyl sulfosuccinate salts, the alkyl group has 4 to 16 carbon atoms. In the polyoxyethylene alkyl ether sulfate salts, the alkyl group has 12 to 20 carbon atoms, and the salts are formed with sodium or ammonium. The number of carbon atoms is preferably 12 to 16. When the number of carbon atoms is 12 to 16, the particle size of the inventive release agent for plastic becomes smaller easily, and storage stability is favorable. In the polyoxyethylene alkyl ether phosphate salts, the alkyl group has 12 to 13 carbon atoms, and the polyoxyethylene group has 4 to 10 carbon atoms. In the alkyl acetate salts, the alkyl group has 8 to 22 carbon atoms, and the salts are formed with sodium, potassium, or ammonium.

There are 0.1 to 15.0 parts by mass of the component (B) anionic surfactant, being an emulsifier, relative to 100 parts by mass of the organopolysiloxane of the component (A). The amount of the component (B) is preferably 0.1 to 10.0 parts by mass, more preferably 0.1 to 8.0 parts by mass. If the amount is less than 0.1 parts by mass, there is risk that the mechanical stability of the inventive release agent for plastic becomes degraded. On the other hand, if the amount is more than 15.0 parts by mass, there is risk that releasability is degraded.

[(C) Polyoxyethylene Alkyl Ether]

(C) 1.0 to 30.0 parts by mass of a polyoxyethylene alkyl ether represented by the following general formula (2), $$C_mH_{2m+1}(OCH_2CH_2)_nOH \quad (2)$$

where "m" represents an integer of 12 to 20, and "n" represents an integer of 4 to 50, provided that when "m" is an integer of 12 to 15, "n" is 8 to 50, and when "m" is 16 to 20, "n" is 4 to 50.

The "m" of the alkyl group of the polyoxyethylene alkyl ether (C) in the formula (2) is an integer of 12 to 20, preferably an integer of 13 to 18, more preferably an integer of 13 to 16. If "m" is smaller than 12, there is risk that cracks appear in the plastic coated with the inventive release agent for plastic. On the other hand, if "m" is greater than 20, the particle size of the inventive release agent for plastic does not easily become small, and there is risk that storage stability, dilution stability, and mechanical stability become degraded. In addition, it is possible to use either a branched or linear alkyl group, and this can be selected depending on how easily the organopolysiloxane of the component (A) is emulsified and how difficult it is for cracks to occur when the composition is applied to plastic.

The "n" of the component (C) polyoxyethylene alkyl ether in the formula (2) is an integer of 4 to 50, preferably 4 to 30, more preferably 4 to 25. If "n" is smaller than 4, there is risk that cracks occur in the plastic coated with the inventive release agent for plastic. On the other hand, if "n" is greater than 50, the polyoxyethylene alkyl ether of the formula (2) becomes solid, and handling becomes difficult.

In addition, if the alkyl group is short and the polyoxyethylene chain is short, cracks become more liable to occur in the plastic. Therefore, when using a polyoxyethylene alkyl ether with a short alkyl group, a short polyoxyethylene chain should be avoided in the polyoxyethylene alkyl ether. Specifically, when "m" is an integer of 12 to 15, "n" is preferably 8 to 50, and when "m" is an integer of 16 to 20, "n" is preferably 4 to 50.

One kind of the polyoxyethylene alkyl ether of the component (C) may be used, or two or more kinds thereof may be used. The HLB of the polyoxyethylene alkyl ether of the component (C) may be 8 to 18, preferably 10 to 17, more preferably 13 to 16. If storage stability, mechanical stability, and dilution stability cannot be achieved, the storage stability, mechanical stability, and dilution stability can be improved by using in combination a polyoxyethylene alkyl ether with a high HLB of 15 to 18 and a polyoxyethylene alkyl ether with a low HLB of 8 to 12 to achieve an HLB of 13 to 16. Meanwhile, if a large amount of the polyoxyethylene alkyl ether of the component (C) with an HLB of 8 to 12 is contained, there is risk that the inventive release agent for plastic causes cracks in the plastic. Therefore, the blended amount of the component (C) having such a structure is preferably small.

The component (C) polyoxyethylene alkyl ether is blended in an amount of 1.0 to 30.0 parts by mass, preferably 2.0 to 25.0 parts by mass, more preferably 3.0 to 21.0 parts by mass. If the amount is less than 1.0 parts by mass, there is risk that the storage stability, dilution stability, and mechanical stability of the inventive release agent for plastic become degraded and wettability to plastic becomes degraded. On the other hand, if the amount is more than 30.0 parts by mass, there is risk that cracks occur when the inventive release agent for plastic is applied to plastic.

Examples of the polyoxyethylene alkyl ether of the component (C) include those shown below, but are not limited thereto.

Polyoxyethylene lauryl ether, polyoxyethylene oleyl ether, polyoxyethylene cetyl ether, polyoxyethylene stearyl ether, polyoxyethylene hexyldecyl ether, polyoxyethylene isostearyl ether, and polyoxyethylene octyldodecyl ether.

[(D) Polyoxyethylene Sorbitan Fatty Acid Ester]
(D) 0.5 to 15.0 parts by mass of a polyoxyethylene sorbitan fatty acid ester represented by the following general formula (3),

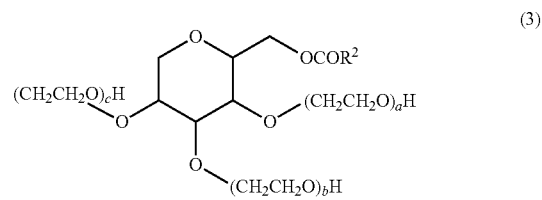

(3)

where $R^2$ represents an alkyl group having 12 to 18 carbon atoms, and a sum of a+b+c is 20.

$R^2$ represents an alkyl group having 12 to 18 carbon atoms, and the sum of a+b+c is 20. In particular, polyoxyethylene sorbitan monolaurate, polyoxyethylene sorbitan monooleate, and polyoxyethylene sorbitan monostearate, respectively having 12, 16, and 18 carbon atoms, are approved as food additives, and are therefore suitable for use in the inventive release agent for plastic for food container or wrap.

The polyoxyethylene sorbitan fatty acid ester of the component (D) exhibits a comparatively high emulsifying capacity to the organopolysiloxane of the component (A), and meanwhile, has a strong point that cracks hardly occur when the composition is applied to plastic. There is also a strong point that by using the polyoxyethylene alkyl ether of the component (C), the polyoxyethylene sorbitan fatty acid ester of the component (D) and a sorbitan fatty acid ester of a component (F) described below in combination, it is possible to enhance the stability of the emulsion obtained by emulsifying the organopolysiloxane of the component (A).

The polyoxyethylene sorbitan fatty acid ester of the component (D) is blended in an amount of 0.5 to 15.0 parts by mass, preferably 0.5 to 10.0 parts by mass, more preferably 2.0 to 10.0 parts by mass. If the component (D) is not blended or if the blended amount of the component (D) is less than 0.5 parts by mass, there is risk that the stability of the emulsion obtained by emulsifying the organopolysiloxane of the component (A) becomes degraded. On the other hand, if the amount is more than 15.0 parts by mass, there is risk that cracks occur when the inventive release agent for plastic is applied to plastic.

[(E) Water]
(E) 50 to 100,000 parts by mass of water.

The water as the component (E) is blended in an amount of 50 to 100,000 parts by mass, preferably 500 to 20,000 parts by mass, more preferably 2,000 to 10,000 parts by mass. If the water (E) is less than 50 parts by mass, there is risk of stickiness, uneven application, and cracks occurring when the inventive release agent for plastic is applied to plastic. On the other hand, if the water (E) is more than 100,000 parts by mass, there is risk that mechanical stability becomes degraded, and oil floating or the like occurs after dilution and stirring.

[(F) Sorbitan Fatty Acid Ester]
The inventive release agent for plastic preferably further contains (F) 5.0 parts by mass or less of a sorbitan fatty acid ester represented by the following general formula (4) relative to 100 parts by mass of the organopolysiloxane (A),

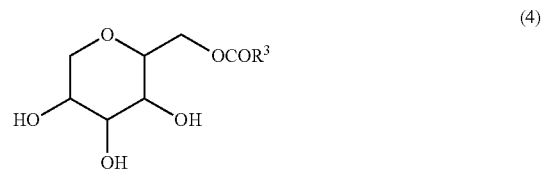

(4)

where $R^3$ represents an alkyl group having 12 to 22 carbon atoms.

$R^3$ represents an alkyl group having 12 to 22 carbon atoms, and in view of emulsifying property, the number of carbon atoms is preferably 12 to 20, more preferably 12 to 18. When the alkyl group of $R^3$ has 12 or more carbon atoms, there is no risk of cracks occurring when the inventive composition is applied to synthetic resin. On the other hand, when the alkyl group of $R^3$ has 22 or fewer carbon atoms, the coated synthetic resin does not whiten. Sorbitan fatty acid esters such as sorbitan monolaurate, sorbitan monooleate, sorbitan monopalmitate, and sorbitan monostearate are permitted for use as food additives. These compounds are also permitted in the positive list of the voluntary standards concerning food containers, wrappers, etc., of Japan Hygienic Olefin and Styrene Plastics Association, and are the most suitable for use in the present invention.

The sorbitan fatty acid ester of the component (F) can be blended in an amount of 0.1 to 5.0 parts by mass, preferably 0.1 to 3.0 parts by mass, more preferably 0.2 to 3.0 parts by mass. When the sorbitan fatty acid ester of the component (F) is 5.0 parts by mass or less, cracks hardly occur when the inventive release agent for plastic is applied.

As described above, to improve the storage stability, mechanical stability, and dilution stability of the inventive release agent for plastic, it is effective to use, as the component (C), a combination of a polyoxyethylene alkyl ether having a high HLB and a polyoxyethylene alkyl ether having a low HLB. However, a release agent for plastic containing a large amount of polyoxyethylene alkyl ether with an HLB of 8 to 12 as the component (C) has a risk of causing stress cracking in plastic. The HLB of the sorbitan fatty acid ester of the component (F) is generally 3.0 to 10.0, which is low, but is less liable to cause stress cracking to plastic than a component (C) having an HLB of a similar level. In addition, by combining the component (D) and the component (F) to make the HLB of the release agent for plastic 13 to 16, the stability of the release agent for plastic is improved even more. Furthermore, by blending the component (F), foamability is reduced, so that handling becomes easier in some cases.

The total amount of the nonionic surfactants of the components (C), (D), and (F) can be 2.5 to 50.0 parts by mass relative to 100 parts by mass of the component (A). The total amount is preferably 2.5 to 35.0 parts by mass, more preferably 3.0 to 30.0 parts by mass. With 2.5 parts by mass or more, the stability of the inventive release agent for plastic does not become degraded, and concentration separation, oil floating, etc. hardly occur. In addition, repellence hardly occurs when the plastic release agent is applied to plastic. Meanwhile, with 50.0 parts by mass or less, stress cracking hardly occurs in plastic when the plastic release agent is applied.

[Preparation of Composition]

An example of a specific method for preparing the inventive release agent for plastic is mainly as shown below.

An organopolysiloxane (A), an anionic surfactant (B), a polyoxyethylene alkyl ether (C), a polyoxyethylene sorbitan fatty acid ester (D), a sorbitan fatty acid ester (F) as necessary, and a part of water (E) are stirred, and after emulsification, the resultant is diluted with the rest of the water (E). If the component (A) cannot be easily emulsified, emulsification can be carried out easily by adding a part of each of the components (A) to (D) and (F), and a part of the component (E), stirring, and then adding the rest of the components (A) to (D) and (F), and further stirring. The component (A) sometimes becomes difficult to emulsify, particularly when the viscosity of the component (A) is lower than 1,000 mm$^2$/s. In such a case, emulsification can be carried out easily by dividing and then adding the components (A) to (D) and (F) as described above. An example of the details of the emulsification method is as follows.

An organopolysiloxane (A), an anionic surfactant (B), a polyoxyethylene alkyl ether (C), a polyoxyethylene sorbitan fatty acid ester (D), a sorbitan fatty acid ester (F) if needed, and a part of water (E) are blended in Combi Mix (PRIMIX Corporation), and the mixture is emulsified with a homomixer (a stirrer employing the rotation of a rotor inside a stator) at 2,000 rpm or a disperser (a stirrer employing the rotation of tooth-form blades) at 2,000 rpm, and an anchor at 20 rpm. After the entire mixture is emulsified, the resultant is stirred for 15 to 180 minutes with a disperser at 2,000 rpm and an anchor at 30 rpm until a predetermined particle size is achieved. Subsequently, the remaining water (E) is added to dilute the resultant with the homomixer at 2,000 to 3,000 rpm. Thus, the inventive release agent for plastic is prepared.

The temperature on emulsification is preferably 0 to 80° C., more preferably 10 to 60° C. Emulsification is easily carried out at a temperature of 10° C. to 80° C., and the produced emulsion tends to be more stable. During emulsification, the pressure can be not only normal pressure, but also reduced pressure or raised pressure. When emulsification is performed under reduced pressure or under pressure, it becomes difficult for bubbles to get mixed in, and emulsification can be performed effectively. When the pressure is to be reduced, the pressure is preferably higher than the vapor pressure of the raw materials, so that the raw materials do not volatilize. In addition, the emulsification time is not particularly specified, and can be the time at which the target particle size is achieved, but is generally preferably 30 to 360 minutes.

The emulsifying machine for emulsification is not particularly limited as long as the raw materials and emulsified composition can be stirred. It is possible to use a colloid mill having a stirring unit including a rotor and a stator (IKA, PUC, NIHONSEIKI KAISHA LTD., and IWAKI & CO., LTD.), a high shear mixer (Silverson and PRIMIX Corporation), a HOMOGENIZING DISPER (PRIMIX Corporation), AGI HOMO MIXER (PRIMIX Corporation), Combi Mix (PRIMIX Corporation) being a 3-axis disperser-kneader having a homomixer, a homogenizing disper, and an anchor mixer, HAAKE Mini LabII (Thermo scientific) being a 2-axis mixer having same-direction screws or different-direction screws, MC15 and MC5 (Rheo Lab), etc.

Besides the surfactants, it is possible to blend in the inventive release agent for plastic, a water-soluble polymer such as a polyvinyl alcohol, methyl cellulose, carboxymethyl cellulose, hydroxymethyl cellulose, polyvinyl pyrrolidone, an alginate salt, xanthan gum, and an acrylic acid polymer as a protective colloid or a thickener in accordance with the purpose of the present invention. Furthermore, it is also possible to blend an antibacterial agent or antiseptic such as an oxazoline-based compound or an aromatic carboxylic acid salt, a fragrance, an antioxidant, an anticorrosive agent, a dye, a filler, a curing catalyst, an organic powder, an inorganic powder, etc.

The average particle size of the inventive release agent for plastic is 200 nm or less, preferably 150 nm or less, more preferably 100 nm or less. If the average particle size is larger than 200 nm, dilution stability and mechanical stability become degraded, and there is risk of oil floating, etc. occurring on dilution or stirring. In addition, there is also risk of concentration separation occurring during storage for a long period. Note that the lower limit of the average particle size is not particularly limited, but can be, for example, 10 nm. The average particle size can be measured with LA920 or LA960 manufactured by Horiba Ltd. or N4 PLUS manufactured by BECKMAN COULTER, and the average particle size measured with LA960 is given in the present description.

A desirable pH of the inventive release agent for plastic at 25° C. is 4.0 to 10.0, preferably 4.5 to 9.0, more preferably 4.5 to 8.0. When the pH is within the range of 4.0 to 10.0, the change in the structure of the component (A) during storage at a high temperature has little influence on releasability of plastic.

The emulsion obtained in the above-described manner is extremely useful as a release agent for use on a plastic sheet or the like for packaging food. For example, the inventive release agent for plastic containing the component (A) in an amount of 0.1 to 2.0 weight % can be applied by rotor damping, a gravure system, or a spray system. The amount to be applied is generally 0.01 to 1.0 $g/m^2$ in dry standards, and an amount of 0.02 to 0.2 $g/m^2$ is particularly suitable. With 0.01 $g/m^2$ or more, sufficient releasability can be achieved, and an amount of 1.0 $g/m^2$ or less is preferable from the viewpoint of transparency and stickiness.

Examples of plastic for food container or wrap include polyethylene, polypropylene, polymethylpentene, polybutene, ethylenetetracyclododecene, ethylene-2-norbornene, polystyrene, AS resin, ABS resin, polyphenylene ether, polyacrylonitrile, polymethacrylstyrene, methacrylic resin, nylon, polyethylene terephthalate, polycarbonate, polyvinyl alcohol, polyacetal, polybutylene terephthalate, polycyclohexylenedimethylene terephthalate, polyethylene naphthalate, vinyl chloride, etc.

According to the present invention, a polyoxyethylene alkyl ether, a polyoxyethylene sorbitan fatty acid ester, and as necessary, a sorbitan fatty acid ester are blended in a certain proportion to emulsify an organopolysiloxane. Thus, it is possible to provide a release agent for plastic that has excellent releasability, favorable dilution stability and mechanical stability, and furthermore that hardly causes stress cracking.

EXAMPLE

Hereinafter, the present invention will be specifically described with reference to Examples and Comparative Examples. However, the present invention is not limited to the following Examples. Note that in the following examples, the value of viscosity was measured with a BM type or BH type rotary viscometer or an Ostwald viscometer at 25° C.

Example 1

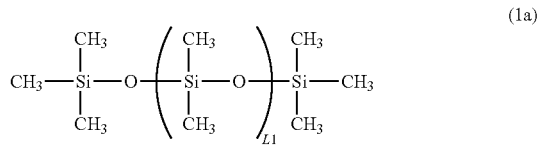
(1a)

30 parts by mass (90 g) of a component (A) [1] organopolysiloxane (1a) shown by the above formula (L1: about 550, viscosity: 10,000 $mm^2/s$), 0.2 parts by mass (0.6 g) of a component (B) [1] EMAL 270J (70% aqueous solution of sodium polyoxyethylene alkyl ether sulfate manufactured by Kao Corporation), 6.0 parts by mass (18 g) of a component (C) [1] LEOCOL TDN90-80 (2a) (80% aqueous solution of polyoxyethylene alkyl ether manufactured by Lion Corporation), 1.6 parts by mass (4.8 g) of a component (D) [1] Nonion LT-221 (polyoxyethylene sorbitan monolaurate manufactured by NOF Corporation), 0.4 parts by mass (1.2 g) of a component (F) Nonion LP-20R (sorbitan monolaurate manufactured by NOF Corporation), and 1.5 parts by mass (4.5 g) of a component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 60.15 parts by mass (180.45 g) of a component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 1 was prepared.

Example 2

30 parts by mass (90 g) of the component (A) [1] organopolysiloxane (1a) (L1: about 550, viscosity: 10,000 $mm^2/s$), 1.3 parts by mass (3.9 g) of the component (B) [1] EMAL 270J (70% aqueous solution of sodium polyoxyethylene alkyl ether sulfate manufactured by Kao Corporation), 6.0 parts by mass (18 g) of the component (C) [1] LEOCOL TDN90-80 (2a) (80% aqueous solution of polyoxyethylene alkyl ether manufactured by Lion Corporation), 1.6 parts by mass (4.8 g) of the component (D) [1] Nonion LT-221 (polyoxyethylene sorbitan monolaurate manufactured by NOF Corporation), 0.4 parts by mass (1.2 g) of the component (F) Nonion LP-20R (sorbitan monolaurate manufactured by NOF Corporation), and 1.0 parts by mass (3.0 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 59.55 parts by mass (178.65 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 2 was prepared.

Example 3

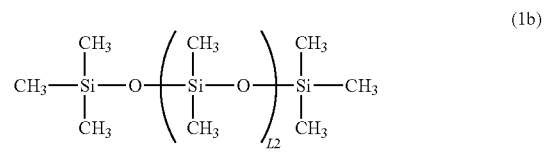
(1b)

30 parts by mass (90 g) of a component (A) [2] organopolysiloxane (1b) shown by the above formula (L2: about 200, viscosity: 1,000 mm²/s), 1.3 parts by mass (3.9 g) of the component (B) [1] EMAL 270J (70% aqueous solution of sodium polyoxyethylene alkyl ether sulfate manufactured by Kao Corporation), 6.0 parts by mass (18 g) of the component (C) [1] LEOCOL TDN90-80 (2a) (80% aqueous solution of polyoxyethylene alkyl ether manufactured by Lion Corporation), 1.6 parts by mass (4.8 g) of the component (D) [1] Nonion LT-221 (polyoxyethylene sorbitan monolaurate manufactured by NOF Corporation), 0.4 parts by mass (1.2 g) of the component (F) Nonion LP-20R (sorbitan monolaurate manufactured by NOF Corporation), and 1.0 parts by mass (3.0 g) of the component (E)-1 water were stirred with HOMOGENIZING MIXER MARK II Model 2.5 (manufactured by PRIMIX Corporation) at 500 rpm. When the entire mixture emulsified, the resultant was stirred with HOMOGENIZING DISPER II at 1,500 rpm for 20 minutes. Then, 59.55 parts by mass (178.65 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass of (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 3 was prepared.

Example 4

30 parts by mass (90 g) of the component (A) [2] organopolysiloxane (1b) (L2: about 200, viscosity: 1,000 mm²/s), 1.3 parts by mass (3.9 g) of the component (B) [1] EMAL 270J (70% aqueous solution of sodium polyoxyethylene alkyl ether sulfate manufactured by Kao Corporation), 1.0 parts by mass (3.0 g) of a component (B) [2] Newcol 291M (70% aqueous solution of sodium dioctyl sulfosuccinate manufactured by NIPPON NYUKAZAI CO., LTD.), 1.25 parts by mass (3.75 g) of the component (C) [1] LEOCOL TDN90-80 (2a) (80% aqueous solution of polyoxyethylene alkyl ether manufactured by Lion Corporation), 1.6 parts by mass (4.8 g) of a component (D) [2] RHEODOL TW-0120V (polyoxyethylene sorbitan monooleate manufactured by Kao Corporation), 0.4 parts by mass (1.2 g) of the component (F) Nonion LP-20R (sorbitan monolaurate manufactured by NOF Corporation) and 1.5 parts by mass (4.5 g) of the component (E)-1 water were stirred with HOMOGENIZING MIXER MARK II Model 2.5 (manufactured by PRIMIX Corporation) at 500 rpm. When the entire mixture emulsified, the resultant was stirred with HOMOGENIZING DISPER II at 1,500 rpm for 20 minutes. Then, 62.8 parts by mass (188.4 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 4 was prepared.

Example 5

30 parts by mass (90 g) of the component (A) [1] organopolysiloxane (1a) (L1: about 550, viscosity: 10,000 mm²/s), 1.3 parts by mass (3.9 g) of the component (B) [1] EMAL 270J (70% aqueous solution of sodium polyoxyethylene alkyl ether sulfate manufactured by Kao Corporation), 6.0 parts by mass (18 g) of the component (C) [1] LEOCOL TDN90-80 (2a) (80% aqueous solution of polyoxyethylene alkyl ether manufactured by Lion Corporation), 2.0 parts by mass (6.0 g) of the component (D) [2] RHEODOL TW-0120V (polyoxyethylene sorbitan monooleate manufactured by Kao Corporation), and 1.0 parts by mass (3.0 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 59.55 parts by mass (178.65 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 5 was prepared.

Example 6

30 parts by mass (90 g) of the component (A) [1] organopolysiloxane (1a) (L1: about 550, viscosity: 10,000 mm²/s), 1.3 parts by mass (3.9 g) of the component (B) [1] EMAL 270J (70% aqueous solution of sodium polyoxyethylene alkyl ether sulfate manufactured by Kao Corporation), 6.0 parts by mass (18 g) of the component (C) [1] LEOCOL TDN90-80 (2a) (80% aqueous solution of polyoxyethylene alkyl ether manufactured by Lion Corporation), 1.6 parts by mass (4.8 g) of the component (D) [2] RHEODOL TW-0120V (polyoxyethylene sorbitan monooleate manufactured by Kao Corporation), 0.4 parts by mass (1.2 g) of the component (F) Nonion LP-20R (sorbitan monolaurate manufactured by NOF Corporation), and 1.0 parts by mass (3.0 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 59.55 parts by mass (178.65 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 6 was prepared.

Comparative Example 1

30 parts by mass (90 g) of the component (A) [1] organopolysiloxane (1a) (L1: about 550, viscosity: 10,000 mm²/s), 1.3 parts by mass (3.9 g) of the component (B) [1] EMAL 270J (70% aqueous solution of sodium polyoxyethylene alkyl ether sulfate manufactured by Kao Corporation), 8.5 parts by mass (25.5 g) of the component (C) [1] LEOCOL TDN90-80 (2a) (80% aqueous solution of polyoxyethylene alkyl ether manufactured by Lion Corporation), and 1.5 parts by mass (4.5 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 58.55 parts by mass (175.65 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 7 was prepared.

Comparative Example 2

30 parts by mass (90 g) of the component (A) [1] organopolysiloxane (1a) (L1: about 550, viscosity: 10,000 mm$^2$/s), 1.3 parts by mass (3.9 g) of the component (B) [1] EMAL 270J (70% aqueous solution of sodium polyoxyethylene alkyl ether sulfate manufactured by Kao Corporation), 4.8 parts by mass (14.4 g) of a surfactant [2] EMULGEN 104P (2b) (polyoxyethylene (4) lauryl ether manufactured by Kao Corporation), 1.6 parts by mass (4.8 g) of the component (D) [2] RHEODOL TW-0120V (polyoxyethylene sorbitan monooleate manufactured by Kao Corporation), 0.4 parts by mass (1.2 g) of the component (F) Nonion LP-20R (sorbitan monolaurate manufactured by NOF Corporation), and 2.0 parts by mass (6.0 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 59.75 parts by mass (179.25 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 8 was prepared.

Comparative Example 3

30 parts by mass (90 g) of a component [3] organopolysiloxane (1c) (L: about 550, content of each of octamethyl cyclotetrasiloxane, decamethyl cyclopentasiloxane, and dodecamethyl cyclohexasiloxane: 3.3%, viscosity: 7,000 mm$^2$/s), 1.3 parts by mass (3.9 g) of the component (B) [1] EMAL 270J (70% aqueous solution of sodium polyoxyethylene alkyl ether sulfate manufactured by Kao Corporation), 6.0 parts by mass (18.0 g) of the component (C) [1] LEOCOL TDN90-80 (2a) (80% aqueous solution of polyoxyethylene alkyl ether manufactured by Lion Corporation), 1.6 parts by mass (4.8 g) of the component (D) [1] Nonion LT-221 (polyoxyethylene sorbitan monolaurate manufactured by NOF Corporation), 0.4 parts by mass (1.2 g) of the component (F) Nonion LP-20R (sorbitan monolaurate manufactured by NOF Corporation), and 2.0 parts by mass (6.0 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 15 minutes. Then, 58.55 parts by mass (175.65 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 9 was prepared.

Comparative Example 4

30 parts by mass (90 g) of the component (A) [1] organopolysiloxane (1a) (L1: about 550, viscosity: 10,000 mm$^2$/s), 6.0 parts by mass (18 g) of the component (C) [1] LEOCOL TDN90-80 (2a) (80% aqueous solution of polyoxyethylene alkyl ether manufactured by Lion Corporation), 1.6 parts by mass (4.8 g) of the component (D) [1] Nonion LT-221 (polyoxyethylene sorbitan monolaurate manufactured by NOF Corporation), 0.4 parts by mass (1.2 g) of the component (F) Nonion LP-20R (sorbitan monolaurate manufactured by NOF Corporation), and 1.5 parts by mass (4.5 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 60.35 parts by mass (181.05 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 10 was prepared.

Comparative Example 5

30 parts by mass (90 g) of the component (A) [1] organopolysiloxane (1a) (L1: about 550, viscosity: 10,000 mm$^2$/s), 1.3 parts by mass (3.9 g) of the component (B) [1] EMAL 270J (70% aqueous solution of sodium polyoxyethylene alkyl ether sulfate manufactured by Kao Corporation), 2.0 parts by mass (6.0 g) of a surfactant [3] polyoxyethylene alkyl ether (2d) ($C_mH_{2m+1}(OCH_2CH_2)_nOH$, where "m" is 10 and "n" is 3), 4.3 parts by mass (12.9 g) of a surfactant [4] 65% aqueous solution of an polyoxyethylene alkyl ether (2e) ($C_mH_{2m+1}(OCH_2CH_2)_nOH$, where "m" is 10 and "n" is 40), 1.6 parts by mass (4.8 g) of the component (D) [1] Nonion LT-221 (polyoxyethylene sorbitan monolaurate manufactured by NOF Corporation), 0.4 parts by mass (1.2 g) of the component (F) Nonion LP-20R (sorbitan monolaurate manufactured by NOF Corporation), and 1.0 parts by mass (3.0 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 59.25 parts by mass (177.75 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 11 was prepared.

Comparative Example 6

An aqueous solution obtained by dissolving 1 part by mass (3 g) of a component (B) [3] EMAL 2FG in 9 parts by mass (27 g) of the component (E)-1 water was blended in a mixture of 29.914 parts by mass (89.742 g) of octamethyl cyclotetrasiloxane and 0.086 parts by mass (0.258 g) of hexamethyldisiloxane, and stirred with HOMOGENIZING MIXER MARK II Model 2.5 (manufactured by PRIMIX Corporation) at 500 rpm. When the entire mixture emulsified, the resultant was stirred for about 15 minutes at a high speed at 5,000 rpm. Then, 49.35 parts by mass (148.05 g) of the component (E)-2 water was added and stirred with HOMOGENIZING MIXER MARK II Model 2.5 (manufactured by PRIMIX Corporation) at 1,500 rpm for 3 minutes for dilution. Next, after subjecting this emulsion to secondary emulsification with a high-pressure homogenizer under a pressure of 300 kg/cm², the emulsion was heated at 50° C. for 20 hours. The emulsion was then cooled at about 15° C. for 10 hours, and 2 parts by mass (6 g) of a 10% aqueous sodium carbonate solution was added for neutralization to obtain an emulsion of a dimethylpolysiloxane. To 100 parts by mass of this emulsion, the same amount of isopropyl alcohol was added to extract the dimethylpolysiloxane, and the extracted oil was washed with water. After that, the resultant was dried at 105° C. to obtain the dimethylpolysiloxane, and the viscosity of the dimethylpolysiloxane was about 10,000 mm²/s at 25° C. In addition, this emulsion contained 1.9% of octamethyl cyclotetrasiloxane, 0.8% of decamethyl cyclopentasiloxane, and 0.15% of dodecamethyl cyclohexasiloxane. To 91.35 parts by mass (274.05 g) of this emulsion-polymerized emulsion, 8.5 parts by mass (25.5 g) of the component (C) [1] LEOCOL TDN90-80 (2a) (80% aqueous solution of polyoxyethylene alkyl ether manufactured by Lion Corporation), 0.1 parts by mass (0.3 g) of sodium benzoate, and 0.05 parts by mass (0.15 g) of citric acid were added and mixed with an anchor-shaped stirring rod at 100 rpm for 30 minutes. Thus, an emulsified composition 12 was prepared.

Comparative Example 7

An aqueous solution obtained by dissolving 1 part by mass (3 g) of the component (B) [3] EMAL 2FG in 9 parts by mass (27 g) of the component (E)-1 water was blended in a mixture of 29.914 parts by mass (89.742 g) of octamethyl cyclotetrasiloxane and 0.086 parts by mass (0.258 g) of hexamethyldisiloxane, and stirred with HOMOGENIZING MIXER MARK II Model 2.5 (manufactured by PRIMIX Corporation) at 500 rpm. When the entire mixture emulsified, the resultant was stirred for about 15 minutes at a high speed at 5,000 rpm. Then, 54.85 parts by mass (164.55 g) of the component (E)-2 water was added and stirred with HOMOGENIZING MIXER MARK II Model 2.5 (manufactured by PRIMIX Corporation) at 1,500 rpm for 3 minutes for dilution. Next, after subjecting this emulsion to secondary emulsification with a high-pressure homogenizer under a pressure of 300 kg/cm², the emulsion was heated at 50° C. for 20 hours. The emulsion was then cooled at about 15° C. for 10 hours, and 2 parts by mass (6 g) of a 10% aqueous sodium carbonate solution was added for neutralization to obtain an emulsion of a dimethylpolysiloxane. To 100 parts by mass of this emulsion, the same amount of isopropyl alcohol was added to extract the dimethylpolysiloxane, and the extracted oil was washed with water. After that, the resultant was dried at 105° C. to obtain the dimethylpolysiloxane, and the viscosity of the dimethylpolysiloxane was about 10,000 mm²/s at 25° C. In addition, this emulsion contained 1.9% of octamethyl cyclotetrasiloxane, 0.8% of decamethyl cyclopentasiloxane, and 0.15% of dodecamethyl cyclohexasiloxane. To 96.95 parts by mass (290.85 g) of this emulsion-polymerized emulsion, 3 parts by mass (9 g) of glycerin, 0.1 parts by mass (0.3 g) of sodium benzoate, and 0.05 parts by mass (0.15 g) of citric acid were added and mixed with an anchor-shaped stirring rod at 100 rpm for 30 minutes. Thus, an emulsified composition 13 was prepared.

Comparative Example 8

30 parts by mass (90 g) of the component (A) [1] organopolysiloxane (1a) (L1: about 550, viscosity: 10,000 mm²/s), 1.3 parts by mass (3.9 g) of the component (B) [1] EMAL 270J (70% aqueous solution of sodium polyoxyethylene alkyl ether sulfate manufactured by Kao Corporation), 12.0 parts by mass (36 g) of the component (C) [1] LEOCOL TDN90-80 (2a) (80% aqueous solution of polyoxyethylene alkyl ether manufactured by Lion Corporation), 1.6 parts by mass (4.8 g) of the component (D) [1] Nonion LT-221 (polyoxyethylene sorbitan monolaurate manufactured by NOF Corporation), 0.4 parts by mass (1.2 g) of the component (F) Nonion LP-20R (sorbitan monolaurate manufactured by NOF Corporation), and 1.0 parts by mass (3.0 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 53.55 parts by mass (160.65 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 14 was prepared.

Comparative Example 9

30 parts by mass (90 g) of the component (A) [1] organopolysiloxane (1a) (L1: about 550, viscosity: 10,000 mm²/s), 1.3 parts by mass (3.9 g) of the component (B) [1] EMAL 270J (70% aqueous solution of sodium polyoxyethylene alkyl ether sulfate manufactured by Kao Corporation), 4.8 parts by mass (14.4 g) of a surfactant [5] polyoxyethylene alkyl ether (2f) ($C_mH_{2m+1}(OCH_2CH_2)_nOH$, where "m" is 22 and "n" is 20), 1.6 parts by mass (4.8 g) of the component (D) [1] Nonion LT-221 (polyoxyethylene sorbitan monolaurate manufactured by NOF Corporation), 0.4 parts by mass (1.2 g) of the component (F) Nonion LP-20R (sorbitan monolaurate manufactured by NOF Corporation), and 2.5 parts by mass (7.5 g) of the component (E)-1 water were stirred with HOMOGENIZING DISPER Model 2.5 (manufactured by PRIMIX Corporation) at 500 rpm. When the entire mixture emulsified, the resultant was stirred at 1,500 rpm for 20 minutes. Then, 59.25 parts by mass (177.75 g) of the component (E)-2 water was added and stirred with HOMOGENIZING MIXER MARK II Model 2.5 (manufactured by PRIMIX Corporation) at 1,500 rpm for 3 minutes for dilution. Subsequently, 0.1 parts by mass (0.3 g) of sodium benzoate and 0.05 parts by mass (0.15 g) of citric acid were added and further stirred with HOMOGENIZING MIXER MARK II Model 2.5 (manufactured by PRIMIX Corporation) at 1,500 rpm for 1 minute. Thus, an emulsified composition 15 was prepared.

Regarding the Examples and Comparative Examples, evaluation was carried out on average particle size, pH, centrifugation stability, water-dilution stability, mechanical stability, wettability to plastic (PET), and stress cracking in plastic (OPS). Tables 1 to 3 show the results.

Average Particle Size:
the value was measured with HORIBA LA960 by diluting the emulsified compositions 1 to 15 about 10 times with water.

pH:
the value was obtained by measuring the emulsified compositions 1 to 15 at 25° C. with a pH meter (LAQUA manufactured by HORIBA, Ltd.).

Centrifugation Stability:
the emulsified compositions 1 to 15 were respectively put in tubes exclusively of about 15 mL, and rotated with a centrifuge H-19FM (manufactured by KOKUSAN Co., Ltd.) at 3,000 rpm for 15 minutes. Then, non-volatile contents (105° C.×3 hours) in 1.0 g of an upper layer portion and 1.0 g of a lower layer portion inside the tube were measured.

When "non-volatile content in upper layer portion"/"non-volatile content in lower layer portion"=0.95 to 1.05, the composition is acceptable. Otherwise, there is possibility of concentration separation during storage over time.

Water-Dilution Stability:
2 g of one of the emulsified compositions 1 to 15 and 98 g of water were mixed to consequently prepare release agents 1 for plastic. The total amount of each release agent 1 for plastic was placed in a 200-mL beaker, and left to stand for 1 day to observe the surface of the release agent 1 for plastic.

Good: the release agent for plastic dispersed without concentration separation.

There were no oil spots or interference film on the surface, or an interference film was formed on about 10 to 30 percent of the surface.

Fair: the release agent for plastic dispersed without concentration separation.

There were no oil spots or interference film on the surface, or an interference film was formed on about 30 to 60 percent of the surface.

Poor: the release agent for plastic dispersed unevenly,
or an interference film or oil spot was formed on 60 percent or more of the surface.

"Good" and "Fair" are acceptable.

Mechanical Stability:
10 g of one of the emulsified compositions 1 to 15 and 90 g of water were mixed to consequently prepare release agents 2 for plastic. Each release agent 2 for plastic was placed in a 200-mL beaker, stirred with HOMOGENIZING MIXER MARK II at 3,000 rpm for 10 minutes, and then left to stand for 1 day to observe the surface of the liquid.

Good: the release agent for plastic dispersed without concentration separation.

There were no oil spots or interference film on the surface, or an interference film was formed on about 10 to 30 percent of the surface.

Fair: the release agent for plastic dispersed without concentration separation.

There were no oil spots or interference film on the surface, or an interference film was formed on about 30 to 60 percent of the surface.

Poor: release agent for plastic underwent concentration separation,
or an interference film or oil spot was formed on 60 percent or more of the surface.

"Good" and "Fair" are acceptable.

Wettability:
the release agent 2 for plastic was applied to a PET film with a wire bar NO. 3 (manufactured by R.D. Specialties, U.S.A). Repellence was observed visually.

Good: the entire film became wet

Fair: repellence occurred partially

Poor: the entire film became repellent immediately after application

"Good" and "Fair" are acceptable.

Crack Resistance:
the release agent 1 for plastic was applied to an OPS sheet with gauze. The OPS sheet was wound around a cylinder having a diameter of 37 mm, and whether a crack occurred was visually observed.

Good: no crack occurred within 75 seconds after winding around the cylinder

Poor: a crack occurred within 75 seconds after winding around the cylinder

"Good" is acceptable.

(Component (A) and Comparative Organopolysiloxane)
Component (A) [1]: organopolysiloxane (1a)
(L1: about 550, viscosity: 10,000 mm²/s)
Component (A) [2]: organopolysiloxane (1b)
(L2: about 200, viscosity: 1,000 mm²/s)

The octamethyl cyclotetrasiloxane, decamethyl cyclopentasiloxane, and dodecamethyl cyclohexasiloxane in the components (A) [1] and [2] were each contained in an amount of less than 0.1%.

Component [3]: organopolysiloxane (1c)
(L1: about 550, content of each of octamethyl cyclotetrasiloxane, decamethyl cyclopentasiloxane, and dodecamethyl cyclohexasiloxane: 3.3%, viscosity: 7,000 mm²/s)

The organopolysiloxane (1c) was prepared by blending the component (A) organopolysiloxane (1a) with octamethyl cyclotetrasiloxane, decamethyl cyclopentasiloxane, and dodecamethyl cyclohexasiloxane so that each content was 3.3%.

Component [4]: organopolysiloxane (1d)
(L1: about 550)

The organopolysiloxane (1d) was prepared by emulsion polymerization, and 6.3% of octamethyl cyclotetrasiloxane, 2.7% of decamethyl cyclopentasiloxane, and 0.5% of dodecamethyl cyclohexasiloxane were contained per 100 parts by mass of the organopolysiloxane (1d).

(Component (B))
Component (B) [1]: EMAL 270J (manufactured by Kao Corporation)
70% aqueous solution of sodium polyoxyethylene (2) alkyl ether sulfate
Component (B) [2]: Newcol 291M (manufactured by NIPPON NYUKAZAI CO., LTD.)
70% aqueous solution of sodium dioctyl sulfosuccinate
Component (B) [3]: EMAL 2FG (manufactured by Kao Corporation)
sodium lauryl sulfate (Component (C) and Comparative Surfactant)
Component (C) [1]: LEOCOL TDN90-80 (80% aqueous solution of polyoxyethylene alkyl ether manufactured by Lion Corporation) (2a)
(80% aqueous solution of $C_mH_{2m+1}(OCH_2CH_2)_nOH$, where "m" is 13 and "n" is 9)
Surfactant [2]: EMULGEN 104P (polyoxyethylene alkyl ether manufactured by Kao Corporation) (2b)
($C_mH_{2m+1}(OCH_2CH_2)_nOH$, where "m" is 12 and "n" is 4)
Surfactant [3]: polyoxyethylene alkyl ether (2d)
($C_mH_{2m+1}(OCH_2CH_2)_nOH$, where "m" is 10 and "n" is 3)
Surfactant [4]: 65% aqueous solution of polyoxyethylene alkyl ether (2e)

$(C_mH_{2m+1}(OCH_2CH_2)_nOH$, where "m" is 10 and "n" is 40)
Surfactant [5]: polyoxyethylene alkyl ether (2f)
$(C_mH_{2m+1}(OCH_2CH_2)_nOH$, "m" is 22 and "n" is 20)

(Component (D))

Component (D) [1]: Nonion LT-221 (manufactured by NOF Corporation)

Polyoxyethylene sorbitan monolaurate

Component (D) [2]: RHEODOL TW-0120V (manufactured by Kao Corporation)

Polyoxyethylene sorbitan monooleate (Component (E))

Component (E)-1 and component (E)-2: water (Component (F))

Component (F): Nonion LP-20R (manufactured by NOF Corporation) sorbitan monolaurate

TABLE 1

| Composition (%) | | Example | | | | | |
|---|---|---|---|---|---|---|---|
| | | 1 | 2 | 3 | 4 | 5 | 6 |
| Component (A) | [1] | 30 | 30 | | | 30 | 30 |
| | [2] | | | 30 | 30 | | |
| Component (B) | [1] | 0.2 | 1.3 | 1.3 | 1.3 | 1.3 | 1.3 |
| | [2] | | | | 1.0 | | |
| Component (C) | [1] | 6.0 | 6.0 | 6.0 | 1.25 | 6.0 | 6.0 |
| Component (D) | [1] | 1.6 | 1.6 | 1.6 | | | |
| | [2] | | | | 1.6 | 2.0 | 1.6 |
| Component (E-1) | | 1.5 | 1.0 | 1.0 | 1.5 | 1.0 | 1.0 |
| Component (E-2) | | 60.15 | 59.55 | 59.55 | 62.8 | 59.55 | 59.55 |
| Component (F) | | 0.4 | 0.4 | 0.4 | 0.4 | | 0.4 |
| Sodium benzoate | | 0.1 | 0.1 | 0.1 | 0.1 | 0.1 | 0.1 |
| Citric acid | | 0.05 | 0.05 | 0.05 | 0.05 | 0.05 | 0.05 |
| Total | | 100 | 100 | 100 | 100 | 100 | 100 |
| Emulsified composition | | 1 | 2 | 3 | 4 | 5 | 6 |
| Average particle size (nm) | | 80 | 70 | 50 | 70 | 80 | 90 |
| pH | | 4.8 | 5.0 | 5.0 | 4.9 | 5.1 | 5.1 |
| Centrifugation stability | | 1.01 | 1.01 | 1.00 | 1.01 | 1.00 | 1.00 |
| Water-dilution stability | | Good | Good | Good | Good | Good | Good |
| Mechanical stability | | Fair | Fair | Fair | Good | Good | Good |
| Wettability | | Good | Good | Good | Fair | Fair | Good |
| Crack resistance | | Good | Good | Good | Good | Good | Good |

TABLE 2

| Composition (%) | | Comparative Example | | | |
|---|---|---|---|---|---|
| | | 1 | 2 | 3 | 4 |
| Component (A) and organopolysiloxane | [1] | 30 | 30 | | 30 |
| | [3] | | | 30 | |
| | [4] | | | | |
| Component (B) | [1] | 1.3 | 1.3 | 1.3 | |
| | [3] | | | | |
| Component (C) and surfactant | [1] | 8.5 | | 6.0 | 6.0 |
| | [2] | | 4.8 | | |
| Component (D) | [1] | | | 1.6 | 1.6 |
| | [2] | | 1.6 | | |
| Component (E-1) | | 1.5 | 2.0 | 2.0 | 1.5 |
| Component (E-2) | | 58.55 | 59.75 | 58.55 | 60.35 |
| Component (F) | | | 0.4 | 0.4 | 0.4 |
| 10% aqueous sodium carbonate solution | | | | | |
| Glycerin | | | | | |
| Sodium benzoate | | 0.1 | 0.1 | 0.1 | 0.1 |
| Citric acid | | 0.05 | 0.05 | 0.05 | 0.05 |
| Total | | 100 | 100 | 100 | 100 |
| Emulsified composition | | 7 | 8 | 9 | 10 |
| Average particle size (nm) | | 170 | 430 | 160 | 80 |
| pH | | 4.8 | 5.3 | 4.9 | 4.9 |
| Centrifugation stability | | 1.01 | 1.00 | 1.01 | 1.01 |
| Water-dilution stability | | Fair | Fair | Fair | Fair |
| Mechanical stability | | Poor | Poor | Poor | Poor |
| Wettability | | Good | Good | Good | Good |
| Crack resistance | | Poor | Poor | Good | Good |

TABLE 3

| Composition (%) | | Comparative Example | | | | |
|---|---|---|---|---|---|---|
| | | 5 | 6 | 7 | 8 | 9 |
| Component (A) and organopolysiloxane | [1] | 30 | | | 30 | 30 |
| | [3] | | | | | |
| | [4] | | 30 | 30 | | |
| Component (B) | [1] | 1.3 | | | 1.3 | 1.3 |
| | [3] | | 1.0 | 1.0 | | |
| Component (C) and surfactant | [1] | | 8.5 | | 12.0 | |
| | [2] | | | | | |
| | [3] | 2.0 | | | | |
| | [4] | 4.3 | | | | |
| | [5] | | | | | 4.8 |
| Component (D) | [1] | 1.6 | | | 1.6 | 1.6 |
| Component (E-1) | | 1.0 | 9.0 | 9.0 | 1.0 | 2.5 |
| Component (E-2) | | 59.25 | 49.35 | 54.85 | 53.55 | 59.25 |
| Component (F) | | 0.4 | | | 0.4 | 0.4 |
| 10% aqueous sodium carbonate solution | | | 2.0 | 2.0 | | |
| Glycerin | | | | 3.0 | | |
| Sodium benzoate | | 0.1 | 0.1 | 0.1 | 0.1 | 0.1 |
| Citric acid | | 0.05 | 0.05 | 0.05 | 0.05 | 0.05 |
| Total | | 100 | 100 | 100 | 100 | 100 |
| Emulsified composition | | 11 | 12 | 13 | 14 | 15 |
| Average particle size (nm) | | 70 | 210 | 210 | 70 | 150 |
| pH | | 5.0 | 5.1 | 5.1 | 5.1 | 5.1 |
| Centrifugation stability | | 1.01 | 1.03 | 0.99 | 0.99 | 1.00 |
| Water-dilution stability | | Fair | Fair | Fair | Good | Fair |
| Mechanical stability | | Fair | Poor | Poor | Fair | Poor |
| Wettability | | Good | Good | Poor | Good | Good |
| Crack resistance | | Poor | Poor | Good | Poor | Poor |

In Comparative Examples 6 and 7, 1.0 parts by mass of a 10% aqueous lauryl sulfate solution and 2 parts by mass of a 10% aqueous sodium carbonate solution react to form 1.1 parts by mass of sodium lauryl sulfate in the final emulsified composition.

It can be seen from Table 1 that the inventive release agents for plastic are each an organopolysiloxane emulsion having excellent dilution stability and mechanical stability, and good wettability, and hardly forming cracks in plastic.

In contrast, in Comparative Examples 1 and 6 containing neither component (D) nor (F) of the present invention, mechanical stability and crack resistance were poor.

Meanwhile, in Comparative Examples 2, 6, and 7, the average particle size of the release agent was larger than 200 nm. It can be considered that mechanical stability was degraded for this reason.

In Comparative Example 2, in which "m" was 12 but "n" was 4 in $C_mH_{2m+1}(OCH_2CH_2)_nOH$ unlike the component (C) of the present invention, cracks were liable to occur.

In addition, cracks were liable to occur also in Comparative Example 5 using the surfactant [3] in which both "m" and "n" in $C_mH_{2m+1}(OCH_2CH_2)_nOH$ are lower than the lower limits in the component (C) of the present invention.

Furthermore, in Comparative Example 9, in which "n" was 20 but "m" was 22 in $C_mH_{2m+1}(OCH_2CH_2)_nOH$ unlike the component (C) of the present invention, mechanical stability was degraded.

In Comparative Example 3, in which the contents of octamethyl cyclotetrasiloxane, decamethyl cyclopentasiloxane, and dodecamethyl cyclohexasiloxane each exceeded 3%, mechanical stability was degraded.

In Comparative Example 4, in which the component (B) of the present invention was not contained, mechanical stability was degraded.

In Comparative Example 7, in which the components (C), (D), and (F) of the present invention were not contained, no nonionic surfactant was used, so that repellence was exhibited, and wettability was poor as a result.

Meanwhile, in Comparative Example 8, in which the component (C) was contained exceeding the upper limit of the range of the amount to be blended relative to the component (A) in the present invention, cracks were liable to occur.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A release agent for plastic, comprising the following components (A) to (E) and having an average particle size of 200 nm or less:
   (A) 100 parts by mass of an organopolysiloxane represented by the following general formula (1) and having a viscosity at 25° C. of 100 to 100,000 mm²/s,

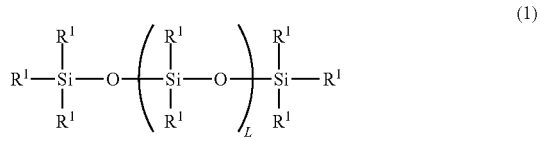

wherein $R^1$ is identical to or different from one another and represents a hydroxy group, a hydrogen atom, a linear, unsubstituted alkyl group having 1 to 32 carbon atoms, or a phenyl group, L represents an integer of 60 to 1500, and octamethyl cyclotetrasiloxane, decamethyl cyclopentasiloxane, and dodecamethyl cyclohexasiloxane are each contained in an amount of less than 3% in the organopolysiloxane (A);

(B) 0.1 to 15.0 parts by mass of one or more anionic surfactants selected from alkyl sulfonate salts, alkylbenzene sulfonate salts, alpha olefin sulfonate salts, polyoxyethylene alkyl ether sulfate salts, alkyl ether sulfate salts, polyoxyethylene alkyl ether acetate salts, alkyl acetate salts, alkyl phosphate salts, polyoxyethylene alkyl ether phosphate salts, alkyl sulfosuccinate salts, polyoxyethylene alkyl ether sulfosuccinate salts, methyl taurate, alaninate, and salts thereof;

(C) 1.0 to 30.0 parts by mass of a polyoxyethylene alkyl ether represented by the following general formula (2), $$C_mH_{2m+1}(OCH_2CH_2)_nOH \qquad (2)$$

wherein "m" represents an integer of 12 to 20, and "n" represents an integer of 4 to 50, provided that when "m" is an integer of 12 to 15, "n" is 8 to 50, and when "m" is 16 to 20, "n" is 4 to 50;

(D) 0.5 to 15.0 parts by mass of a polyoxyethylene sorbitan fatty acid ester represented by the following general formula (3),

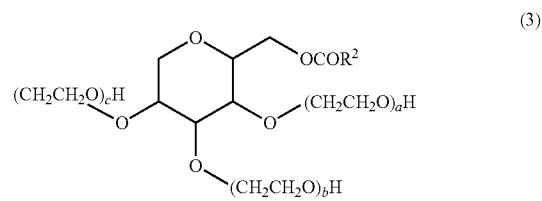

wherein $R^2$ represents an alkyl group having 12 to 18 carbon atoms, and a sum of a+b+c is 20; and (E) 50 to 100,000 parts by mass of water.

2. The release agent for plastic according to claim 1, further comprising (F) 5.0 parts by mass or less of a sorbitan fatty acid ester represented by the following general formula (4) relative to 100 parts by mass of the organopolysiloxane (A),

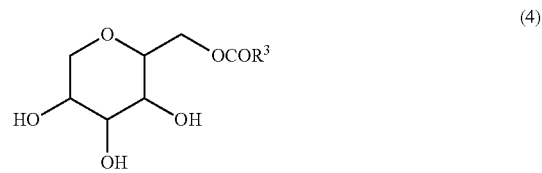

wherein $R^3$ represents an alkyl group having 12 to 22 carbon atoms.

3. The release agent for plastic according to claim 2, wherein the sorbitan fatty acid ester (F) is contained in an amount of 0.1 to 5.0 parts by mass.

4. The release agent for plastic according to claim 3, wherein the anionic surfactant (B) is contained in an amount of 0.1 to 10.0 parts by mass.

5. The release agent for plastic according to claim 3, wherein the release agent for plastic has an average particle size of 100 nm or less.

6. The release agent for plastic according to claim 3, wherein the release agent for plastic has a pH at 25° C. of 4.0 to 10.0.

7. The release agent for plastic according to claim 3, wherein the release agent for plastic is used for plastic for food container or wrap.

8. The release agent for plastic according to claim 2, wherein the anionic surfactant (B) is contained in an amount of 0.1 to 10.0 parts by mass.

9. The release agent for plastic according to claim 2, wherein the release agent for plastic has an average particle size of 100 nm or less.

10. The release agent for plastic according to claim 2, wherein the release agent for plastic has a pH at 25° C. of 4.0 to 10.0.

11. The release agent for plastic according to claim 2, wherein the release agent for plastic is used for plastic for food container or wrap.

12. The release agent for plastic according to claim 1, wherein the anionic surfactant (B) is contained in an amount of 0.1 to 10.0 parts by mass.

13. The release agent for plastic according to claim 12, wherein the release agent for plastic has an average particle size of 100 nm or less.

14. The release agent for plastic according to claim 12, wherein the release agent for plastic has a pH at 25° C. of 4.0 to 10.0.

15. The release agent for plastic according to claim 12, wherein the release agent for plastic is used for plastic for food container or wrap.

16. The release agent for plastic according to claim 1, wherein the release agent for plastic has an average particle size of 100 nm or less.

17. The release agent for plastic according to claim 16, wherein the release agent for plastic has a pH at 25° C. of 4.0 to 10.0.

18. The release agent for plastic according to claim 16, wherein the release agent for plastic is used for plastic for food container or wrap.

19. The release agent for plastic according to claim 1, wherein the release agent for plastic has a pH at 25° C. of 4.0 to 10.0.

20. The release agent for plastic according to claim 1, wherein the release agent for plastic is used for plastic for food container or wrap.

* * * * *